United States Patent [19]

Bourdon et al.

[11] 4,381,556
[45] Apr. 26, 1983

[54] VIDEODISC READER WITH LONGITUDINALLY DISPLACED TURNTABLE

[75] Inventors: Guy Bourdon; Jean-Claude Lehureau, both of Paris, France

[73] Assignee: Thomson-CSF, Paris, France

[21] Appl. No.: 212,549

[22] Filed: Dec. 3, 1980

[30] Foreign Application Priority Data

Dec. 21, 1979 [FR] France ................. 79 31486

[51] Int. Cl.³ .......................................... G11B 17/00
[52] U.S. Cl. ..................................... 369/44; 369/213;
369/239; 369/241; 369/111; 310/105; 318/687
[58] Field of Search ..................... 369/43, 44, 111, 213,
369/239, 240, 241; 360/97, 99, 71, 73;
358/128.5, 342; 346/137; 310/168, 170, 268,
105; 318/687, 686, 614

[56] References Cited

U.S. PATENT DOCUMENTS

| 1,212,692 | 1/1917 | Ruckgober | 310/105 |
| 3,138,669 | 6/1964 | Robinow | 369/111 |
| 3,391,255 | 7/1968 | Gregg | 369/44 |
| 3,829,612 | 8/1974 | Beyers | 360/73 |
| 3,963,863 | 6/1976 | Malissin | 369/44 |

FOREIGN PATENT DOCUMENTS 1499772  6/1972  Fed. Rep. of Germany .
2222718  8/1972  France .

Primary Examiner—Alan Faber
Attorney, Agent, or Firm—Oblon, Fisher, Spivak, McClelland & Maier

[57] ABSTRACT

There is disclosed a device for displacing a video disk with respect to a reading head which includes the driving of a conductive disk by means of a video disk rotational motor. The conductive disk passes through the air gaps of two electromagnets located on either side of the displacement axis of a movable member supporting the rotational motor. By differentially energizing the electromagnets, a force is produced which provides for forward and backward movement of the complete movable member of the reader.

5 Claims, 3 Drawing Figures

VIDEODISC READER WITH LONGITUDINALLY DISPLACED TURNTABLE

BACKGROUND OF THE INVENTION

1. Field of the Invention

The present invention relates to devices making it possible to radially displace a rotated disk. Such devices are more particularly used in video disk readers in order to make it possible to read the track carrying the information by displacing said disk relative to a fixed reading head. The invention also relates to video disk readers equipped with such a device.

2. Description of the Prior Art

It is known to record on a disk-like support information representing, for example, a television signal. The information is carried by a spiral track, whose pitch is approximately a few microns. In order to read this track the disk is rotated at a relatively high speed, for example 1500 revolutions per minute or r.p.m. and a reading head equipped with an optical device is radially displaced in order to make it possible to read with a light beam the information carried by the track. This reading head has means, for example oscillating mirrors, making it possible to correct rapid radial and tangential fluctuations of the point to be read on the groove. These means function on the basis of reading signals in which are sampled adequate error signals.

The forward movement of the reading head is brought about by means of a forward movement mechanism. The movement of this mechanism is controlled by the radial error signal suitably filtered in such a way that the head follows the mean forward movement of the track, the radial fluctuations being corrected by the means referred to hereinbefore.

In certain cases it is desired to advance the head much more rapidly, for example when it is desired to look at a sequence recorded further on the disk. In this case the reading light beam no longer has to follow the track and jumps from one turn to the next. By counting these turn jumps it is possible to obtain information on the head location and stop the rapid forward movement at a given point corresponding to the information which it is desired to read.

Essentially two types of mechanism have been previously used for obtaining this radial movement of the head.

One of the mechanisms has an electromagnetic piston which moves under the action of a variable magnetic field produced in a coil. Such a device requires particularly heavy and expensive magnets and the power levels required for supplying the coil during the rapid displacement are high.

Another mechanism has a lead screw actuated by a motor. When the said screw rotates it drives a nut fixed to the reading head support making the head move forwards or backwards. To have a slow and a fast forward movement speed it is usually necessary to use two different motors and a clutch system making it possible to use one or other of said motors. This system is particularly complex, complicated and unreliable.

BRIEF SUMMARY OF THE INVENTION

The present invention therefore relates to a device making it possible to longitudinally displace a rotatory motor of the type having a movable member to which the motor is fixed, and means making it possible to guide the displacement of the movable member in a direction perpendicular to the motor rotation axis. The present invention also includes a conductive disk rotated by the motor shaft by means of a first electromagnet provided with an air gap enclosing part of the conductive disk positioned on one side of the disk diameter parallel to the displacement direction of the movable member and means which energize the electromagnet for displacing the movable member.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
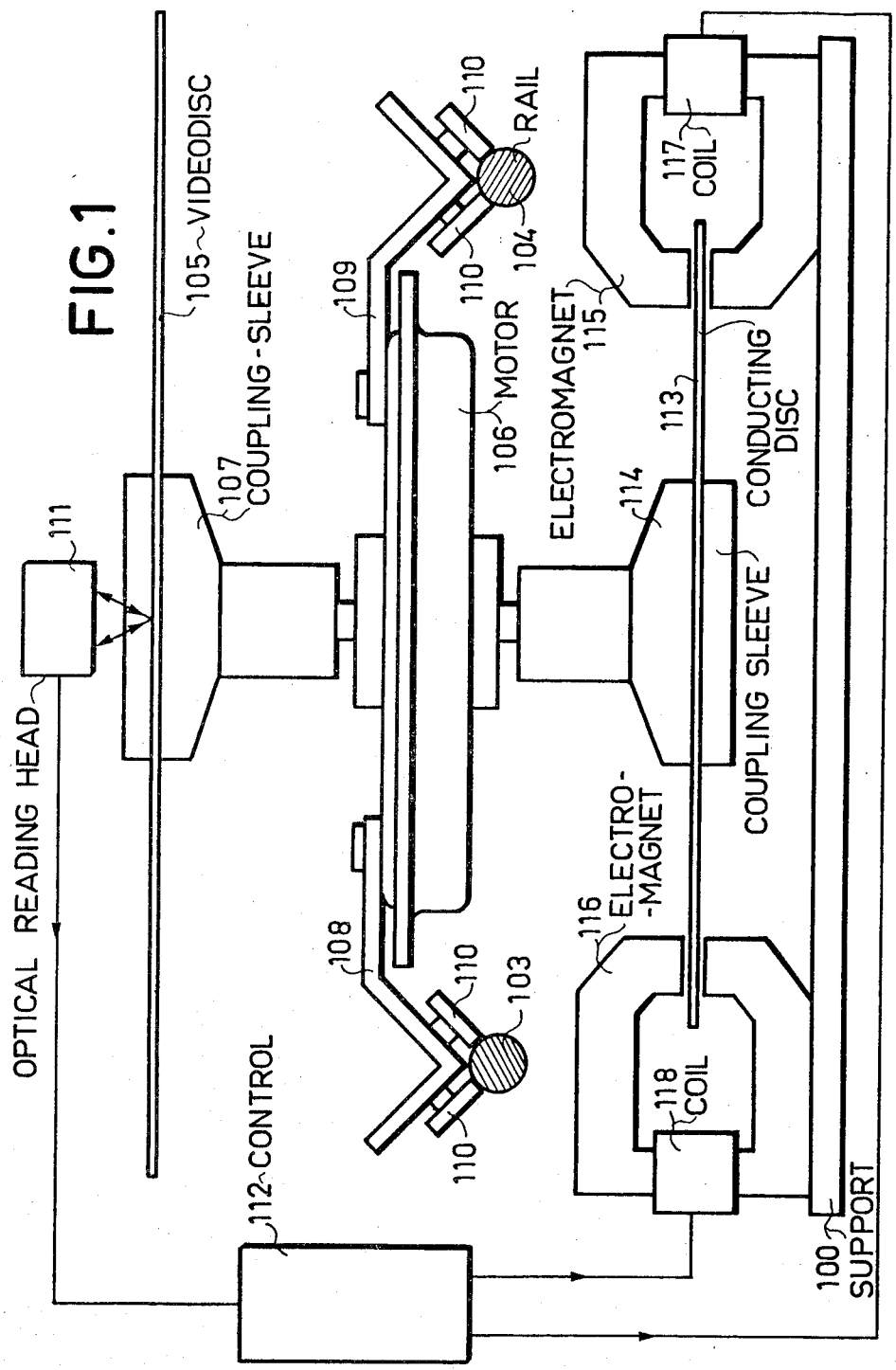
FIG. 1 a profile view of the essential elements of the video disk reader provided with a video disk displacement device according to the invention.
Figure 2:
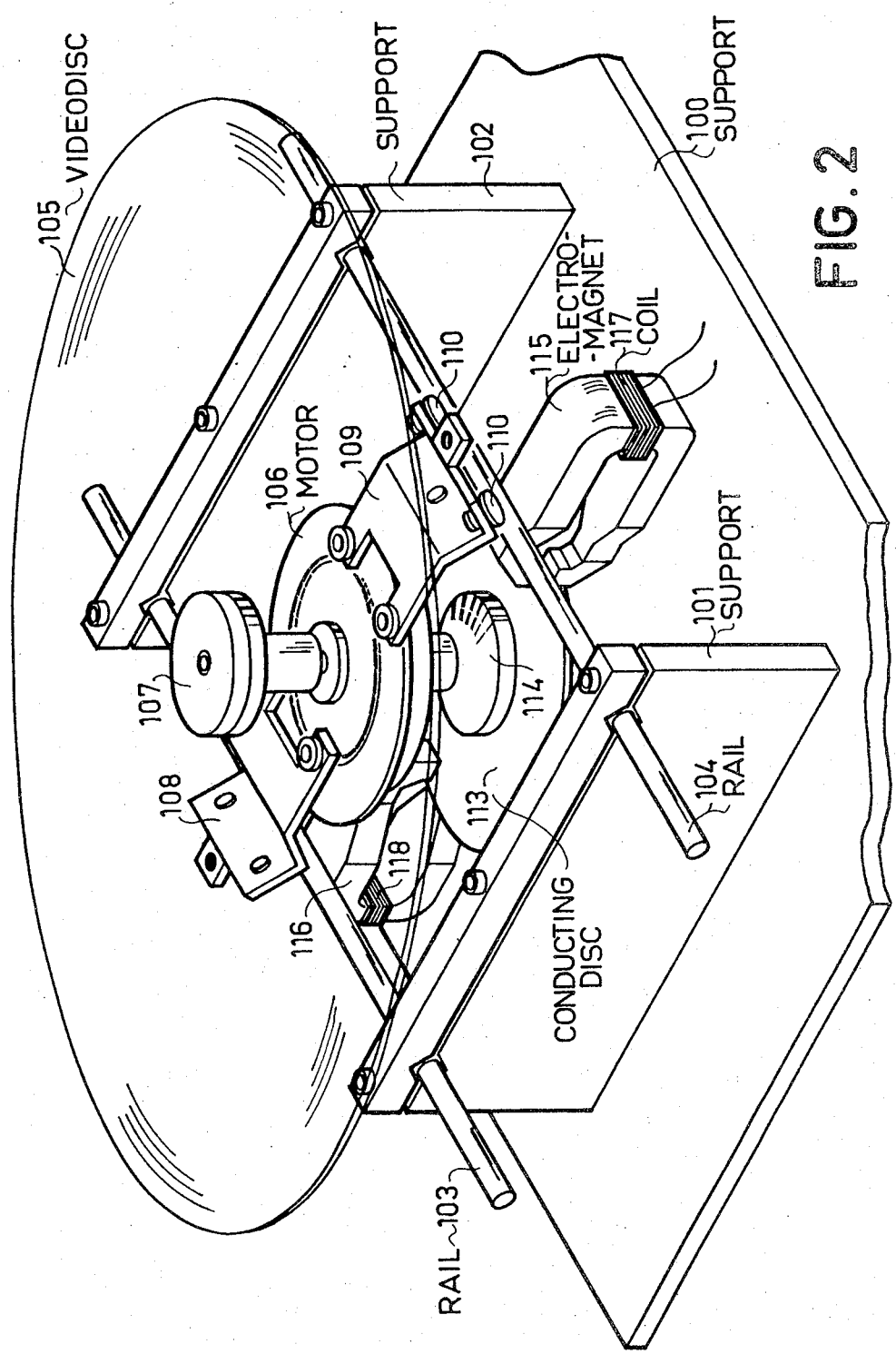
FIG. 2 a oblique perspective of this video disk reader.

The video disk reader components partly shown in FIGS. 1 and 2 are mounted on a base plate 100. Two supports 101 and 102 fixed to the base plate 100 carry two rails 103, 104 defining a rolling path for the moving means of the video disk reader.

A rotatory motor 106 drives a video disk 105 via a driving sleeve 107 fixed to the upper part of the motor shaft. Motor 106 is supported by two angle plates 108, 109. These angle plates rest on rails 103, 104 by means of a system of rollers 110. Thus, the video disk can travel in linear manner beneath a reading head 111 along a direction fixed by rails 103, 104.

A light beam emitted by head 111 is reflected on the surface of video disk 105 and the return beam, modulated by the information recorded on the video disk track, excites photoelectric cells contained in head 111.

The reading signal obtained in this way is decoded in order to extract therefrom the information useful for the operation of the reader. Among these signals the mean value of the error signal used by the servomechanism for radially following the track is transmitted to a control box 112 making it possible to control the displacement of the movable member of the reader on rails 103, 104.

For this purpose the lower end of motor 106 rotates a conductive disk 113 via a fixing member 114. This disk passes between the pole pieces of two electromagnets 115, 116 positioned diametrically with respect to the disk on a shaft perpendicular to the displacement direction of the movable member.

The control box 112 energizes the electromagnet coils 117, 118 in such a way that the movable member advances or moves back.

Thus, the electromagnets induce eddy currents in conductive disk 113 and the interaction thereof with the field of the electromagnets produces forces opposing the disk movement. Thus, these forces are tangential and exert a braking torque on the disk and the motor. However, because they are tangential, they have a component parallel to the displacement direction of the movable member tending to displace the latter. In order that the component due to the two electromagnets is not O, it is necessary for the magnetic field developed by the latter to be different in each case. Consequently the braking force is directed in one direction for one of the electromagnets and in the other direction for the other electromagnet. Thus, as a function of the desired displacement direction one or other of the electromagnets must be energized, or optionally they must be energized in a differential manner. Under the action of these forces the movable member moves forwards or backwards by rolling on rails 103 and 104 and thus the video disk 105 passes beneath the fixed reading head 111.

In a practical embodiment the weight of the movable member is approximately 1500 grams, including a motor weighing 600 grammes with a nominal power of 30 Watts. The conductive disk 113 is made from copper and has a diameter of 14 centimeters for a thickness of 1 mm.

Electromagnets 116 and 115 have a two mm thick air gap for a surface of 1 cm$^2$. When a 1 A current is passed through their coil a 0.5 Tesla field is obtained in this air gap.

Under these conditions on energizing one of these electromagnets with a 1 A current and with the motor rotating at the reading speed of 1500 r.p.m., the force applied to the disk and therefore the movable member is approximately 15 Newtons.

The movable member exposed to this force in this way can then travel a distance of 10 cm in 0.2 seconds. This 10 cm distance corresponds to the area recorded on a 30 cm diameter disk. Thus, access can be obtained to any point on the video disk track in less then 0.2 seconds.

The power supplied by the rotatory motor is essentially used for overcoming the braking force applied by the electromagnet. This power is then substantially equal to 120 W. It exceeds the nominal power of the motor, but the latter can supply it as a peak value for the 0.2 seconds necessary for scanning the area recorded on the disk.

In normal operation the force necessary for advancing the movable member so that it can read the complete track is very small, because it is only used for overcoming the frictional forces of the rollers on the rails and these forces are very limited. A force equal to a few percent of the weight of the movable member is more than adequate. Under these conditions the two electromagnets are energized to obtain a substantially constant braking force equal for example to 80% of the nominal power of the motor, i.e. in this case 24 W. With the two electromagnets energized, the resulting force is zero if the current passing through them is the same. To obtain the displacement force necessary for reading, these two electromagnets are energized with slightly different currents.

Figure 3:
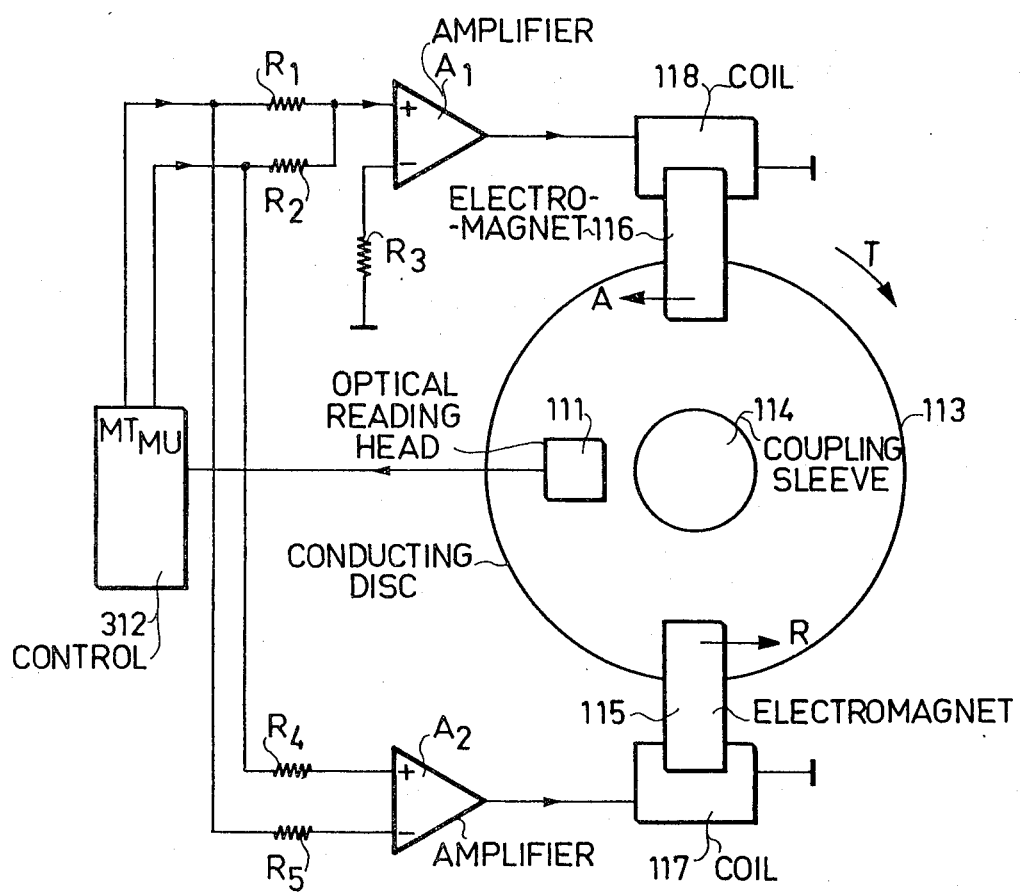
FIG. 3 a diagrammatic view of the elements for controlling the device of FIGS. 1 and 2.

In the diagrammatic exemplified embodiment of the device for energizing coils 117, 118 of the electromagnets shown in FIG. 3, the latter are connected to the output of two differential power amplifiers $A_1$, $A_2$.

The reading head, 111 beneath which the video disk travels, transmits reading signals to a decoding member 312 which supplies two signals MT and MU respectively giving the mean values of the error voltages of the radial tracking signal and the tangential tracking signal of the servomechanisms for tracking the reading spots.

Signal MT is applied via a resistor $R_1$ to the positive input of amplifier $A_1$ and via a resistor $R_5$ to the negative input of amplifier $A_2$. The signal MU is applied via a resistor $R_2$ to the positive input of amplifier $A_1$ and via a resistor $R_4$ to the positive input of amplifier $A_2$.

Furthermore the negative input of amplifier $A_1$ is connected to earth via a resistor $R_3$ in order to fix its potential.

Disk 113 rotating in rotation direction T between the poles of the electromagnets is exposed, under the action of electromagnet 116 to a braking force A directed to the left in the drawing and under the action of electromagnet 115 to a braking force R directed to the right in the same drawing.

When the disk rotation speed varies from its nominal speed the error signal MU increases or decreases and, as it is applied to both positive inputs of amplifiers $A_1$, $A_2$, the current supplied to the electromagnets varies in the same direction, which increases or decreases by the same quantity forces A and R and consequently only varies the braking torque without modifying the resulting quantity, so that the movable member moves forwards.

However, when the mean position of the reading spot on the video disk moves away from the optical axis of the reading device, signal MT increases or decreases. As the signal MT is applied to the positive input of amplifier $A_1$ and to the negative input of amplifier $A_2$ the current supplied by one of these amplifiers increases, whilst the current supplied by the other decreases. Thus, under the action of signal MT one of the forces A or R increases and the other decreases by the same value. Consequently their resulting torque remains constant and this also applies to the video disk rotation speed. However, their resulting quantity in the translation direction of the movable member increases or decreases making it possible to make up the mean deviation of the reading spot with respect to the optical axis of the reading system 111 by advancing the movable member at a higher or lower speed.

During its translation movement the conductive disk 113 passes through the air gaps of the electromagnets in such a way that the active areas of the disk where forces A and R are exerted move towards or away from the centre of said disk. Thus, the reaction of the system is not linear. This non-linearity could be compensated in various ways, e.g. by providing two pairs of electromagnets on either side of the median position of the disk in its movement. Thus, when one of the electromagnets of one pair moved towards the centre of the disk, the other would move away from it and a certain compensation would take place.

However, the measurements performed on the device, the dimensioning having been given hereinbefore, have shown that controls would permit the direct compensation of this non-linearity due to their retroaction without there being any tendency towards instability.

Thus, this device makes it possible to stabilize the rotation speed and also the displacement of the disk beneath the reading head. This applying both to the continuous reading of the track and to a random investigation of a random turn on said track.

What is claimed is:

1. A device for providing a rectilinear displacement, with respect to a fixed support, of a rotary engine having a shaft, said displacement being in a direction perpendicular to the axis of rotation of said shaft, said device comprising:

a movable carriage rigidly locked with said engine;
means to guide said carriage along said perpendicular direction;

magnetic means producing a first air gap provided on said support and producing a magnetic output across of said first air gap;

a conductive disk fixed on said shaft and crossing said air gap wherein the magnetic output of said magnetic means produces said displacement; and electronic control means for controlling the magnetic output of said magnetic means in order to control said displacement of said rotary engine.

2. A device according to claim 1, wherein said magnetic means further comprises a means for producing a second air gap enclosing part of said conductive disk which second air gap is positioned on the side of said disk opposite said first air gap and wherein a line connecting the centers of said first and second air gap is perpendicular to the direction of said displacement.

3. A device according to claim 2 wherein said electronic control means outputs a signal to differentially energize the output of said magnetic means for providing said displacement in one of two directions perpendicular to the axis of rotation of said shaft.

4. A device according to claim 3 wherein said electronic control means provides an output by controlling the magnetic output of said magnetic means in order to maintain a constant rotation speed of said motor by breaking said motor via said conductive disk.

5. A video disk reader comprising:

a device according to any one of claims 1-4;

means for affixing the video disk to the rotational motor shaft;

a reading head for supplying tracking and rotational speed error signals; and means for feeding said error signals to said electonic control means so that said displacement of said rotary engine causes said reading head to follow a video disk track and ensures that the speed is kept constant.

* * * * *